United States Patent [19]
Dryer

[11] 3,820,830
[45] June 28, 1974

[54] CAPTIVE PLASTIC STATIC SEAL IN RING JOINT GROOVE

[75] Inventor: Eldon O. Dryer, Malibu, Calif.

[73] Assignee: W. S. Shamban & Co., Los Angeles, Calif.

[22] Filed: Feb. 16, 1973

[21] Appl. No.: 333,167

[52] U.S. Cl............. 285/336, 277/235 R, 277/171
[51] Int. Cl............................................. F16l 19/00
[58] Field of Search ........... 285/336, 363, 364, 365, 285/366, 367, 368; 277/235 R, 171, 167.3, 167.5

[56] References Cited
UNITED STATES PATENTS

| | | | |
|---|---|---|---|
| 1,567,813 | 12/1925 | Oleson............................. | 285/336 X |
| 2,330,425 | 9/1943 | Hilton.............................. | 285/336 X |
| 2,392,182 | 1/1945 | Payne.............................. | 277/171 X |
| 2,764,311 | 9/1956 | Blackman....................... | 277/235 X |
| 2,898,000 | 8/1959 | Hanny............................. | 285/336 X |
| 3,329,447 | 7/1967 | Hitz................................. | 285/336 X |
| 3,479,063 | 11/1969 | Raver.............................. | 285/336 X |
| 3,594,022 | 7/1971 | Woodson........................ | 285/336 |
| 3,682,489 | 8/1972 | Fischer........................... | 277/171 X |

*Primary Examiner*—Alfred R. Guest
*Attorney, Agent, or Firm*—Smyth, Roston & Pavitt

[57] ABSTRACT

A sealing assembly including a retainer having first and second pairs of legs projecting axially thereof and defining first and second grooves, respectively. First and second seals of deformable sealing material are positioned in the first and second grooves, respectively. This sealing assembly is adapted for use between two members, such as pipes, which cooperate with the retainer to provide first and second completely enclosed cavities for the seals. The legs of the retainer are resiliently deformable and the legs of each pair are cammed toward each other by cooperation with cam surfaces on the first and second members. This assists in compressively loading the seals and assures that the seal cavities are completely closed to avoid extrusion of the seals.

12 Claims, 3 Drawing Figures

PATENTED JUN 28 1974 3,820,830
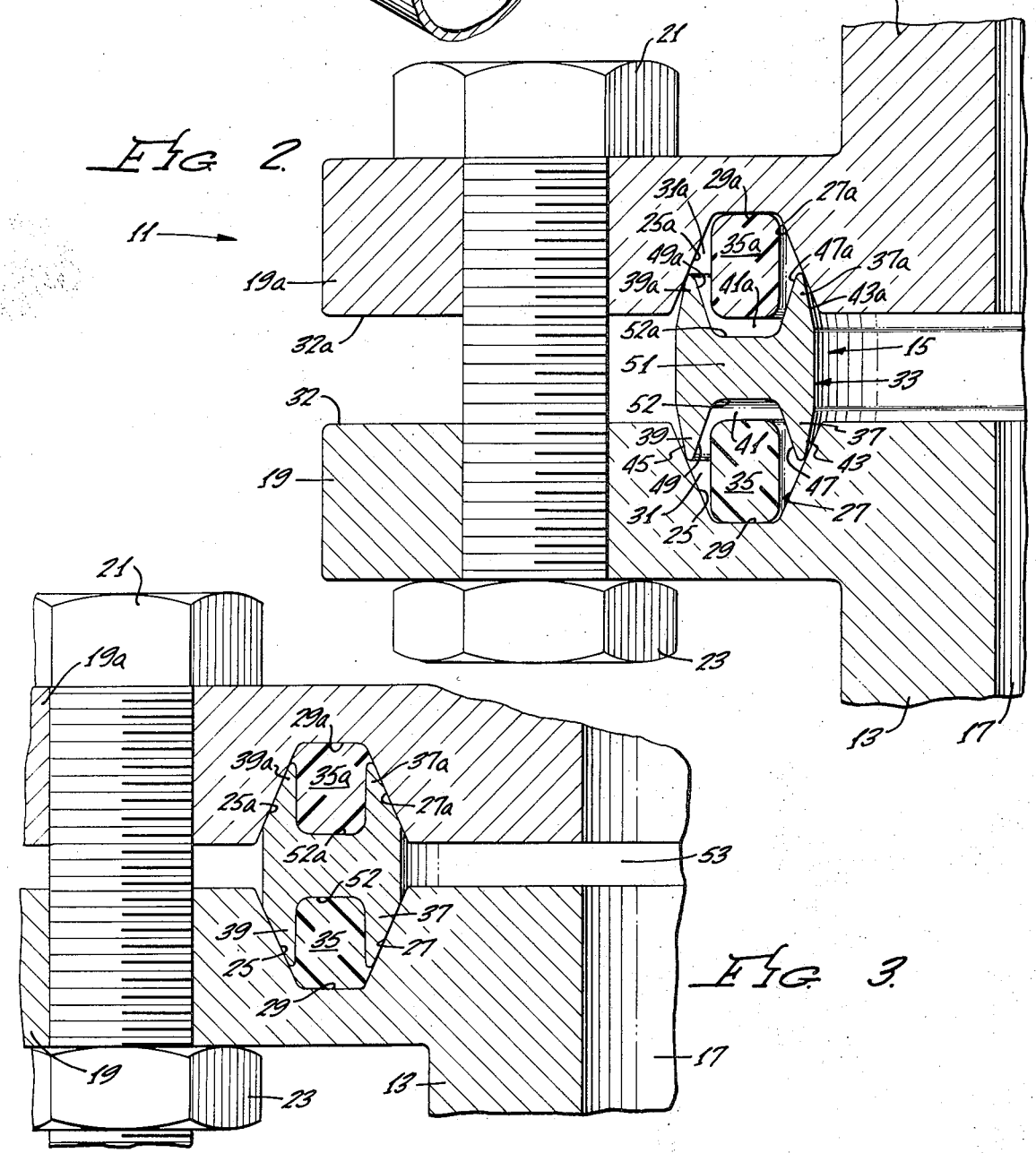

CAPTIVE PLASTIC STATIC SEAL IN RING JOINT GROOVE

The invention described herein was made in the performance of work under a NASA contract and is subject to the provisions of Section 305 of the National Aeronautics and Space Act of 1958, Public Law 85–568 (75 Stat. 435; 42 U.S.C. 2457).

BACKGROUND OF THE INVENTION

It is often necessary to provide a sealed joint between two fixed, fluid carrying conduits. For example, the conduits may have flanges which are bolted or otherwise secured together. A seal is mounted in confronting grooves formed in the flanges to seal the flanges against leakage.

Heretofore, metal seals have been used for this purpose. However, metal seals require a very high force to deform them, and the surfaces of the flanges which contact the metal seal must be very smooth and free of contaminants. In addition, metal seals are reusable only in a limited sense.

SUMMARY OF THE INVENTION

The present invention overcomes these problems and provides a novel leakproof seal by utilizing the captive seal principle. A captive seal is one in which a sealing material is completely confined and compressively loaded beyond its yield point. The sealing material completely fills the cavity in which it is positioned. The compressive loading is sufficient to cause the sealing material to flow into the minute crevices and surface irregularities of the walls of the cavity to form a tight seal. One advantage of captive seals is that the surfaces which confine the seal need not have a good finish. Captive seal constructions are shown, for example, in U.S. Pat. Nos. 3,572,735 and 3,594,022.

In order to utilize the captive seal principle, it is necessary that the seal cavity be completely enclosed to prevent the seal from extruding out of this cavity when it is under compressive load. In addition, the enclosed cavity must be provided without resorting to intricately shaped members which would prevent the captive seal from being commercially feasible. Finally, means must be provided for compressively loading this seal well beyond its yield point.

These objectives are accomplished with the present invention by providing a sealed joint which includes a first member, which may be a fluid carrying conduit, having wall means defining a groove therein and a second member including first and second projecting walls defining a second groove. The projecting walls are receivable in the first groove and they are resiliently deformable toward each other. The surfaces of both of the grooves cooperate to define a completely enclosed cavity for the seal.

To highly compressively load the seal, the two members are axially advanced toward each other. Cam means are provided on the wall means and the projecting walls for camming the projecting walls toward each other. This movement of the projecting walls toward each other assists in compressively loading the seal and tightly closes the interface between the projecting walls and the side walls of the groove. The projecting walls are not of intricate configuration.

The projecting walls and the side walls of the groove slidably cooperate to resiliently force the projecting walls toward each other. To assure that the seal cavity will be tightly closed when the seal is being deformed, the wall means should tightly engage the projecting walls before the seal is deformed sufficiently to extrude from the cavity.

The wall means and the projecting walls can be configured in different ways. However, in a preferred construction, the walls means includes opposed side walls and an end wall with the side walls converging as they extend toward the end wall. The projecting walls also include peripheral surfaces engageable with the side walls and converging as they extend toward the end wall. Surfaces such as these provide the desired sliding cam action. The projecting legs are preferably wedge-shaped in cross section to enhance the resilient deformability of the legs.

Although each of the first and second members may be in the form of a fluid carrying conduit, in one preferred construction, only the first member is a fluid carrying conduit and the second member is a retainer for the seal. The retainer is symmetrical in axial cross section about a central radial line and thus includes two sets of projecting walls and two grooves for retaining first and second seals. The retainer is positionable between the first member and another fluid carrying conduit which may be identical to the first member. Thus, the seal assembly includes two separate seals, one for each of the conduits.

The invention can best be understood by reference to the following description taken in connection with the accompanying illustrative drawing.

BRIEF DESCRIPTION OF THE DRAWING

FIG. 1 is a perspective view of a sealed joint constructed in accordance with the teachings of this invention.

FIG. 2 is an enlarged, fragmentary, sectional view taken generally along line 2—2 of FIG. 1 showing the seal assembly of this invention in a relaxed condition.

FIG. 3 is an enlarged, fragmentary, sectional view similar to FIG. 2 with the sealing assembly under compression and in a sealing mode.

DESCRIPTION OF THE PREFERRED EMBODIMENT

FIG. 1 shows a sealed joint 11 constructed in accordance with the teachings of this invention. The sealed joint 11 includes identical conduits or pipes 13 and 13a and a sealing assembly 15 (FIG. 2). The sealing assembly 15 can be used with different members and the pipes 13 and 13a are purely illustrative. As the pipes 13 and 13a are identical, portions of the pipe 13a corresponding to portions of the pipe 13 are designated by corresponding reference numerals followed by the letter a.

The pipe 13 in the embodiment illustrated has a cylindrical passage 17 extending therethrough and a circumferentially extending radial flange 19 which completely surrounds the passage 17. The pipes 13 and 13a are joined by a plurality of bolts 21 and nuts 23 which extend through openings in the flanges 19 and 19a.

The flange 19 has a wall means including converging cams or side walls 25 and 27 and an end wall 29 which define an annular groove 31 in the flange 19. The side walls 25 and 27 converge as they extend toward the end wall 29. The groove 31 opens at an end face 32 of the flange 19 and is in confronting relationship with an identical groove 31a formed in the flange 19a. The cross section of the groove 31 and of the sealing assembly 15 shown in FIG. 2 is typical.

The sealing assembly 15 includes a retainer 33 and identical seals 35 and 35a. The retainer is constructed of a strong material having some resilience such as steel. The axial cross section of the retainer 33 is symmetrical about a radial line drawn through its center. Accordingly, only one-half of the retainer 33 is described in detail and corresponding portions of the other half of the retainer are designated by corresponding reference numerals followed by the letter a.

The retainer has inner and outer radially spaced, concentric, annular legs or projecting walls 37 and 39. The projecting walls 37 and 39 project axially and define an annular retainer groove 41 therebetween. The projecting walls 37 and 39 are resiliently deformable toward each other.

Although the projecting walls 37 and 39 may be of different configurations in cross section, in the embodiment illustrated the projecting walls 37 and 39 have sloping inner and outer peripheral surfaces 43 and 45, respectively. The peripheral surfaces 43 and 45 are generally conical and converge in axial cross section as they extend toward the end wall 29. Although different constructions could be used, in the embodiment illustrated the projecting walls 37 and 39 have surfaces 47 and 49, respectively, defining side walls of the groove 41 which extend away from each other as they extend toward the end wall 29. The retainer 33 in the embodiment illustrated is generally H-shaped in cross section with the grooves 41 and 41a thereof being separated by a web 51. The web 51 defines an end wall or surface 52 of the groove 41.

The seal 35 is annular and is generally rectangular in cross section. The seal 35 is constructed of deformable sealing material. Although the seal 35 may be constructed of an elastomer for many applications, a plastic sealing material such as polytetrafluoroethylene or another fluoroplastic is preferred.

The sealing assembly 15 is positioned between the flanges 19 and 19a with the projecting walls 37, 39 and 37a, 39a, being partially received by the grooves 31 and 31a, respectively. Thus, the grooves 31 and 41 open toward each other. In the position shown in FIG. 2, the outer end of the projecting walls 37 and 39 are in engagement with the converging side walls 27 and 25, respectively. The side walls 27, 25, the end wall 29, the surfaces 47, 49 and the end surface 52 cooperate to define a completely enclosed annular seal cavity for receiving the seal 35. In the position shown in FIG. 2, the seal 35 is under no compressive load. Thus, the seal cavity is completely enclosed before any deformation of the seal 35 occurs, and this assures that the seal 35 cannot extrude out of the seal cavity. The grooves 31a and 41a cooperate in the same manner to provide a completely enclosed seal cavity for the seal 35a.

In the position shown in FIG. 2, the projecting walls 37 and 39 are in a relaxed condition and are not deformed toward each other. The peripheral surfaces 43 and 45 of the projecting walls 37 and 39 converge more slowly than the side walls 25 and 27. Thus, the peripheral surface 45 and the side wall 25 are not parallel. In the embodiment illustrated, the retainer 33 and the groove 31 are symmetrical in axial cross section about an axially extending line drawn through the center of the groove and the center of the retainer.

To make the sealing assembly 15 operative, it is only necessary to tighten the nuts 23 as shown in FIG. 3. Tightening of the nuts 23 advances the flanges 19 and 19a axially toward each other. This causes relative sliding movement between the side walls 25 and 27 and the projecting walls 39 and 37, respectively. Because the peripheral surfaces 43 and 45 converge at a slower rate than the side walls 27 and 25, respectively, this sliding movement results in the projecting walls 37 and 39 being cammed radially outwardly and radially inwardly, respectively. The projecting walls 37 and 39 are siliently deformable so that this camming action tightly loads the projecting walls against the side walls 25 and 27 with the result that the interface between the flange 19 and the retainer 33 is tightly closed to prevent extrusion of the seal 35. This tight closure of the seal cavity preferably occurs before the seal 35 is deformed or before the seal 35 is deformed sufficiently so as to flow into contact with the interface.

As the flanges 19 and 19a are drawn toward each other, the end wall 52 moves toward the end wall 29 and the surfaces 47 and 49 are moved toward the seal 35. Ultimately, the seal 35 is compressively engaged by the end walls 29 and 52 to provide an axial compressive load on the seal. In addition, the seal 35 is radially squeezed between the surfaces 47 and 49. In accordance with the captive plastic seal principle which is fully described in U.S. Pat. No. 3,572,735, the compressive load applied to the seal 35 is many times its yield point with the result that the seal undergoes plastic deformation. The volume of the seal cavity is progressively reduced as the nuts 23 are tightened until the seal 35 completely fills the cavity. Tightening of the nuts 23 causes the seal 35 to flow into the minute surface irregularities of the surfaces defining such cavity. This causes the seal 35 to provide tightness even though the surfaces defining the seal cavity may be relatively rough. Extrusion of the seal 35 is prevented by the projecting walls 37 and 39. As the seal cavity volume is decreased, the projecting walls 37 and 39 are forced progressively tighter against the side walls 27 and 25, respectively. Thus, the seal cavity is closed off progressively more tightly as the compressive load on the seal 35 increases. The projecting walls 37a and 39a are resiliently deformed in the same manner as the projecting walls 37 and 39. Accordingly, the operation of the sealing assembly with respect to the seal 35a is identical to the operation of the sealing assembly with respect to the seal 35.

The angles of the surfaces 43 and 45 and of the side walls 25 and 27 can be varied depending upon the results desired. Generally it is desirable to utilize the minimum amount of force to deflect the projecting walls 37 and 39. On the other hand, this force must be sufficient to tightly close the seal cavity to prevent extrusion of the seal 35. By balancing these factors, appropriate angles can be selected.

In the position shown in FIG. 3, the projecting walls 37 and 39 are preferably completely received by the groove 31. If the projecting walls 37 were partially outside of the groove 31, they may be caused to expand into a gap 53 between the flanges 19 and 19a when the seal 35 is highly loaded.

Although an exemplary embodiment of the invention has been shown and described, many changes, modifications and substitutions may be made by one having ordinary skill in the art without necessarily departing from the spirit and scope of this invention.

I claim:

1. A sealed joint comprising:
   a first member having wall means defining a first groove therein, said first groove circumscribing a region of the first member;
   a second member including first and second projecting walls circumscribing regions of the second member and defining a second groove opening toward said first groove and circumscribing a region of the second member, said projecting walls being receivable in said first groove, at least one of said projecting walls being deformable toward the other of the projecting walls;
   cam means on said wall means of said first groove for camming said projecting walls toward each other as the projecting walls are advanced into the first groove;
   a seal of deformable sealing material in said grooves, said seal being compressibly loaded and deformed by said projecting walls as said projecting walls are cammed toward each other; and
   at least one of said members defining a fluid carrying passage communicating with the other of said members.

2. A sealed joint as defined in claim 1 wherein said wall means includes opposed side walls forming at least portions of the sides of said first groove, said projecting walls being engageable with said side walls, respectively, said engagement between said side walls and said projecting walls occurring before the seal is substantially compressibly deformed.

3. A sealed joint as defined in claim 1 wherein said cam means includes a sloping surface on said wall means.

4. A sealed joint as defined in claim 1 wherein said wall means includes converging side wall portions and an end wall, said converging side wall portions converging as they extend toward the end wall, said cam means including said converging side wall portions, said first and second projecting walls being inner and outer peripheral walls, respectively, said inner and outer projecting walls having inner and outer peripheral surfaces, respectively, which converge as they extend toward said end wall, said converging side wall portions being engageable with the inner and outer peripheral surfaces, respectively, to cam the projecting walls toward each other.

5. A sealed joint as defined in claim 1 wherein said projecting walls and said wall means at least partially define a completely enclosed seal cavity, said seal completely filling said seal cavity.

6. A sealed joint as defined in claim 5 wherein said seal is constructed of a plastic material.

7. A sealed joint as defined in claim 6 wherein said wall means includes converging side wall portions and an end wall, said converging side wall portions converging as they extend toward the end wall, said cam means including said converging side wall portions, said first and second projecting walls being inner and outer projecting walls, respectively, said inner and outer projecting walls having inner and outer peripheral surfaces, respectively, which converge as they extend toward said end wall, said converging side wall portions being engageable with the peripheral surfaces, respectively, to cam the projecting walls toward each other, said projecting walls being resiliently deformable toward each other, said projecting walls engaging said converging sidewall portions prior to said seal being substantially deformed by said members.

8. A sealed joint comprising:
   a first member having wall means defining a first groove therein;
   a second member including first and second projecting walls defining a second groove opening toward said first groove, said projecting walls being receivable in said first groove, at least one of said projecting walls being deformable toward the other of the projecting walls;
   cooperating surfaces on said projecting walls and said wall means of said first groove for camming said projecting walls toward each other as the projecting walls are advanced into the first groove, said grooves defining a completely enclosed seal cavity;
   a seal of deformable sealing material in said seal cavity, said seal being compressibly loaded and deformed by said projecting walls as said projecting walls are cammed toward each other; and
   means for retaining said members in position with the projecting walls advanced into said first groove.

9. A sealing assembly comprising:
   a retainer of generally ring-like configuration;
   said retainer having first and second pairs of legs projecting generally axially of the retainer in generally opposite directions and defining first and second circumferentially extending grooves, respectively;
   each of said pairs of legs including an inner leg and an outer leg;
   each of said legs extending circumferentially and being resiliently deflectable toward the other leg of the associated pair of legs;
   at least one leg of each of said pair of legs having a peripheral circumferentially extending surface which extends both axially and radially of the retainer to reduce the thickness of said one leg whereby said one leg can be more readily deflected; and
   first and second seals in said first and second grooves, respectively, each of said seals being constructed of deformable sealing material.

10. A sealing assembly as defined in claim 9 wherein each of said seals is constructed of plastic material and said retainer is constructed of metal.

11. A sealing assembly as defined in claim 9 wherein each of said legs is generally wedge-shaped in cross section.

12. A sealed joint comprising:
   first and second conduits, each of said conduits having a passage adapted to carry a fluid and a flange, said flanges being in confronting relationship;
   means for drawing said flanges together to thereby interconnect said conduits with said passages being in communication;
   said flanges of said first and second conduits including wall means defining first and second flange grooves, respectively, each of said flange grooves having converging side wall portions and an end wall with the converging side wall portions converging as they extend toward the associated end wall;

said flange grooves being in confronting relationship and opening toward each other;

a retainer of generally ring-like configuration between said flanges, said retainer having first and second pairs of legs projecting generally axially of the retainer in generally opposite directions and defining first and second circumferentially extending retainer grooves, respectively;

each of said pairs of legs including an inner leg and an outer leg, each of said legs extending circumferentially and being resiliently deflectable toward the other leg of the associated pair of legs;

at least one leg of each of said pair of legs having a peripheral circumferentially extending surface which extends both axially and radially of the retainer so that said one leg is readily deflectable toward the other leg of the assocaited pair of legs;

said first and second pairs of legs being receivable in said first and second flange grooves, respectively, said converging side wall portions of said flange grooves cooperating with the associated legs to cam the legs of each pair of legs toward each other as the flanges are drawn together;

said first flange groove and said first retainer groove defining a first completely enclosed seal cavity and said second flange groove and said second retainer groove defining a second completely enclosed seal cavity; and first and second seals in said first and second seal cavities, respectively, each of said seals being constructed of a deformable sealing material and being compressively deformed by the retainer and the wall means, said first and second seals completely filling their respective seal cavity.

* * * * *